May 20, 1930.  R. BACHON  1,759,728
MOLDING MACHINE
Filed Dec. 31, 1927   3 Sheets-Sheet 1
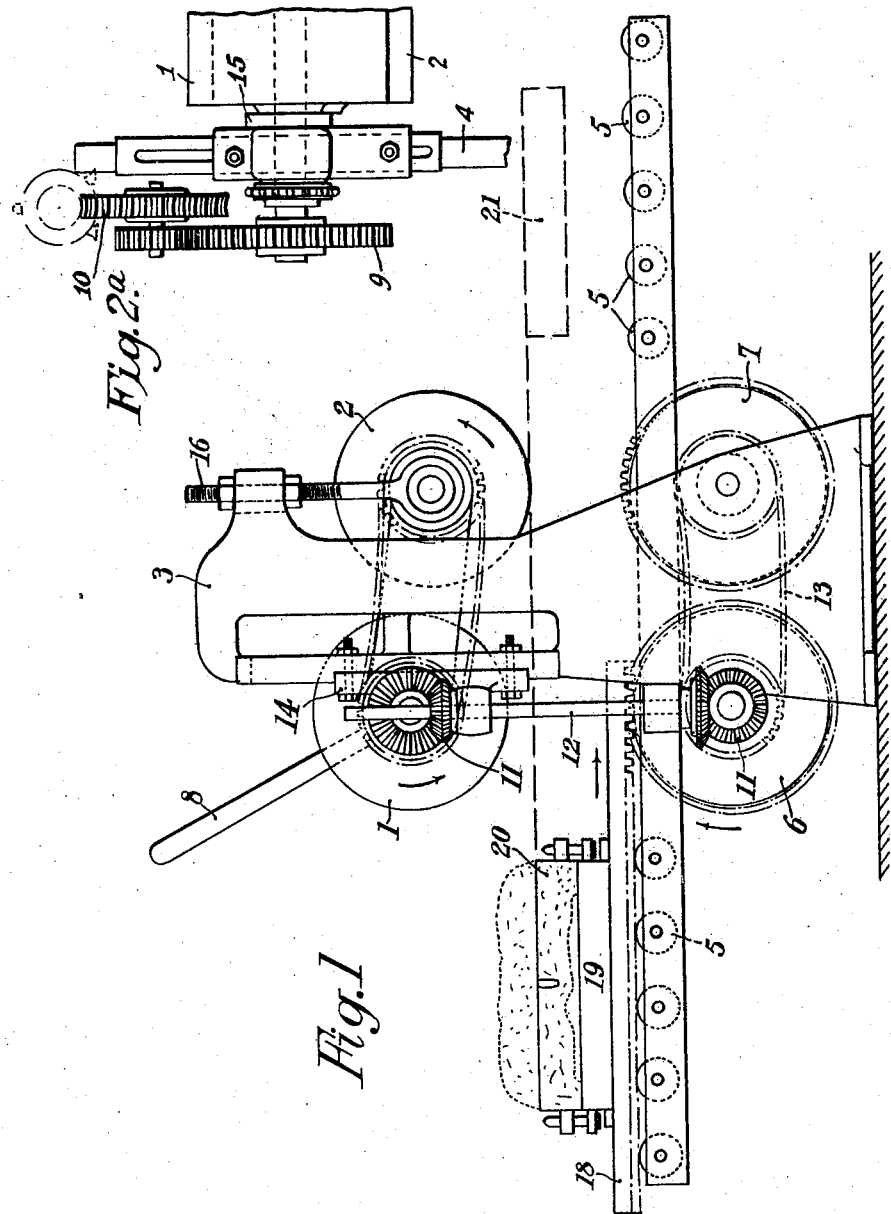
R. Bachon
INVENTOR
By Marks & Clerk
Attys.

May 20, 1930. R. BACHON 1,759,728
MOLDING MACHINE
Filed Dec. 31, 1927 3 Sheets-Sheet 2

R. Bachon
INVENTOR
By: Marks & Clark
Attys.

May 20, 1930.　　　　R. BACHON　　　　1,759,728
MOLDING MACHINE
Filed Dec. 31, 1927　　　3 Sheets-Sheet 3
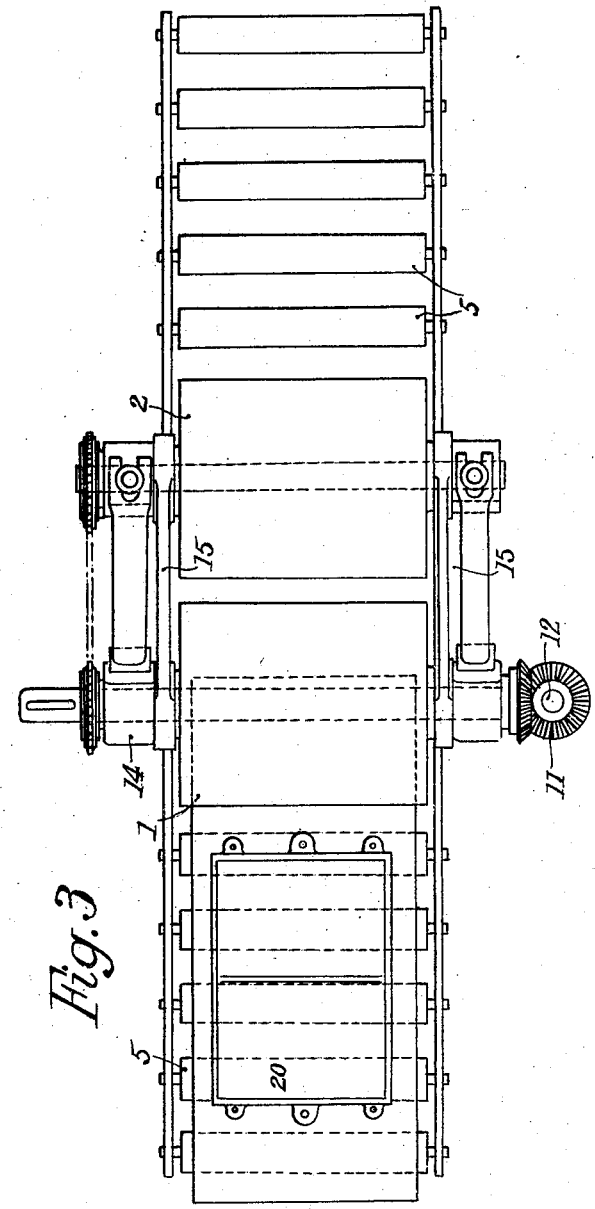
R. Bachon
INVENTOR Patented May 20, 1930

1,759,728

UNITED STATES PATENT OFFICE

ROGER BACHON, OF BOURGES, FRANCE, ASSIGNOR OF ONE-HALF TO SOCIÉTÉ ANONYME DES USINES DE ROSIERES, OF BOURGES, FRANCE

MOLDING MACHINE

Application filed December 31, 1927, Serial No. 243,967, and in France January 6, 1927.

The present invention relates to a molding machine, in which the sand is pressed in the molding frame by means of pressing cylinders which are actuated by hand or by a suitable motor.

The said apparatus is much superior to the known disc or plate machines from the fact that it requires much less force, since the plate is required to press at the same time upon the whole surface of the frame, whilst each cylinder presses only upon a width of a few centimeters. In this manner hand control can be used for pressing large frames which could not be thus pressed by the known hand operated machines.

In the case of mechanical drive, the machine may be continuously operated, and this affords a very large output.

The appended drawings show by way of example an embodiment of the invention.

Fig. 1 is a side view of the machine.

Figure 2:
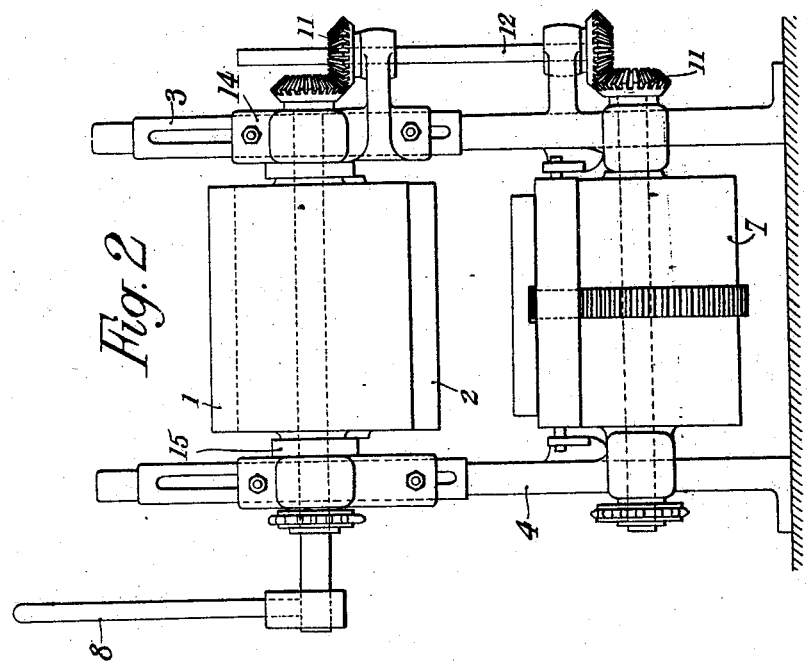
Fig. 2 is an end view.

Fig. 2ª is a fragmentary view corresponding to Fig. 2, but showing a modification of the invention.

Fig. 3 a plan view.

Figure 4:
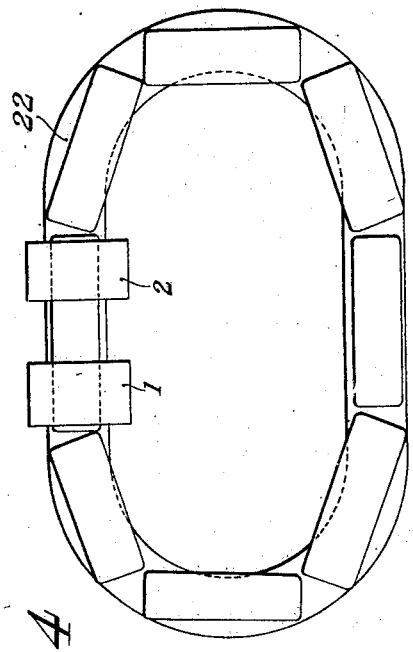

Fig. 4 shows a plant for the continuous molding of small frames.

Figure 5:
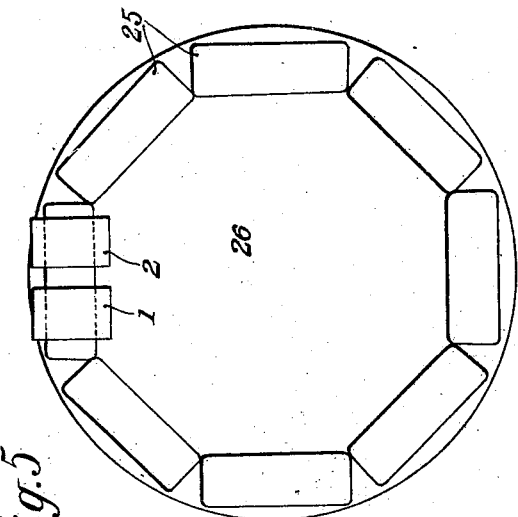

Fig. 5 is a like plant for heavy frames.

In Figs. 1 to 3, the main frame consists of two uprights, one situated on the right hand side 3 and the other situated on the left hand side 4.

The said uprights support the pressing cylinders as well as the roller device in the horizontal position.

The said roller device consists of a series of small rollers 5 and of two actuating, counter pressure cylinders or, rollers 6—7 which receive the counter pressure due to the pressure of the cylinders 1 and 2.

The pressing drum 1 is controlled either by hand, by the lever 8, or by gearing 9 actuated by an electric motor, with the use of a speed-reducing device 10; (this device is shown in the dot-and-dash lines in Fig. 2).

The drum 1 imparts its motion to the drum 2 by a chain and chain wheels, and also to the driving roller 6 by the bevel gearing 11 and the vertical shaft 12.

The roller 6 drives the roller 7 by means of the chain 13 and coacting chain wheels.

The drum 1 is mounted upon two bearings 14 whose height can be adjusted; said bearings are each provided with a cylindrical journal co-operating with one end of the supports 15 whose other end receives the axle of the drum 2, so that this drum is pivotally mounted on the axle of the drum 1 and can be vertically adjusted by the threaded rods 16.

The rollers 6 and 7 are provided at the middle part with a gear wheel for actuating the mold carrying disc 18 which carries a rack upon its lower face.

The operation is as follows.

The piece or pattern 19 is secured to the disc 18. A molding frame 20 is secured by pins to the pattern 19, and it is filled with sand. The height of the said drums has been so regulated that the horizontal plane of the upper edges of said frame shall be tangent to the lower generatrix of the drum 2, and that the drum 1 shall be somewhat higher than the drum 2.

Due to the rotation of the drum 1 in the direction of the arrow, the disc 18 will be actuated as well as the frame filled with sand, below the drums 1 and 2 which exercise pressure by their rotation. When the frame arrives at 21 upon the small rollers 5, it is now to be disengaged from its contents, either by hand if it is light, or by the use of a suitable ejecting device which is properly placed upon the said rollers if it is heavy.

The pattern 19 is brought into its original position by the rotation of the drums in the opposite direction, and the operation is again commenced.

Figs. 4 and 5 show plants adapted for a large output, in which the machine is driven by electric power.

Herein the direction of rotation of the drums and the direction of motion of the set of rollers are invariable, in order to provide for a constant functioning. In this case the rollers form a closed circuit.

In the case of molding which is performed in small frames or in small pieces, as shown in Fig. 4, the set of rollers 22 comprises small rollers, and this device is covered with plates each of which carries a pattern 19; said patterns have a continuous and slow motion in order to permit the various operations required in the formation of a mold.

For a large-sized frame, as shown in Fig. 5, the said roller device consists of a set of unmolding parts 25 mounted on a rotatable plate 26 which is set in continuous rotation, so that each unmolding part will proceed in succession below the pressing rollers 1 and 2.

The said rotary machine is particularly advantageous for the molding of small and medium-sized pieces in flat frames.

The pieces having a certain height may also be molded by the use of two cylinders or two separate sets of cylinders, adapted for pressure.

The first cylinder (or set) will exercise pressure upon a mold or form suitable for the piece and placed upon the frame in order to obtain the first settling of the sand. Between the two sets, this form will be removed and the filling with sand will be completed, the sand being pressed by the second set.

The number of drums in use may obviously be varied, and even a single drum might be used. Also one may vary the construction of the machine frame, of the roller device and of the driving and pressing means, without departing from the principle of the invention.

Having thus described my apparatus, what I claim as new therein, and my own invention is:

1. In a molding machine, the combination of a frame, a series of horizontal rollers on this frame forming a roller path, a molding frame movable on the said rollers, a first pressing cylinder mounted at the upper part of the frame, means for adjusting the position of this cylinder in height, a second pressing cylinder disposed, on the frame at a lower level than the first one, means for adjusting this second cylinder in height, and two counter pressure rollers mounted on the frame just beneath the pressing cylinders at the level of the said roller path, driving means acting upon the first pressing cylinder, power transmission means between the two pressing cylinders and power transmission means between the two counter pressure rollers.

2. In a molding machine, the combination of a frame, a series of horizontal rollers on this frame, forming a rolling path, a molding frame movable on these rollers, a first pressing cylinder above the said molding frame, means for adjusting the position, in height, of this cylinder, a second pressing cylinder above the said molding frame, arranged at a lower level than the first pressing cylinder, means for adjusting the position, in height, of this second pressing cylinder, and two counter-pressure rollers mounted on the frame vertically to the said pressing cylinders, at the level of the said rolling path, and means for producing the rotation of the said counter-pressure rollers and the displacement of the said molding frame.

3. In a molding machine, the combination of a frame, a series of horizontal rollers on this frame, forming a rolling path, a molding frame, movable on these rollers, a first pressing cylinder above the said molding frame, means for adjusting the position, in height, of this cylinder, a second pressing cylinder above the said molding frame, and arranged at a lower level than the first pressing cylinder, means for adjusting the position, in height, of this second pressing cylinder, two counter-pressure rollers mounted on the frame vertically to the said pressing cylinders at the level of the said rolling path, a rack on the underside of the said molding frame, a toothed crown on the said counter-pressure rollers, adapted to gear with the said rack, means for transmitting the movement between the first counter-pressure roller and the first pressing cylinder, and means for transmitting the movement between the first pressing cylinder and the second pressing cylinder.

4. In a molding machine, the combination of a frame, a series of horizontal rollers on this frame, forming a rolling path, a molding frame movable on these rollers, a first pressing cylinder above the said molding frame, means for adjusting the position, in height, of this cylinder, a second pressing cylinder above the said molding frame, and arranged at a lower level than the first pressing cylinder, means for adjusting the position, in height, of this second pressing cylinder, two counter-pressure rollers mounted on the frame, vertically to the said pressing cylinders at the level of the said rolling path, means for producing the rotation of the said counter-pressure rollers and the displacement of the said molding frame, means for transmitting the movement between the first counter-pressure roller and the first pressing cylinder, adapted to allow the adjustment in height of the said pressing cylinder, a link pivotally connected to the axis of the first pressing cylinder and carrying at its free end the second pressing cylinder, means for adjusting the position, in height, of this second pressing cylinder, sprocket wheels on both pressing cylinders, and a driving chain passing over the said sprocket wheels.

In testimony whereof I have hereunto affixed my signature.

ROGER BACHON.